Nov. 16, 1954 M. D. CONSOLO ET AL 2,694,538
SUPPORTING MEANS FOR ROD-SHAPED BODIES
Filed June 18, 1948 2 Sheets-Sheet 1
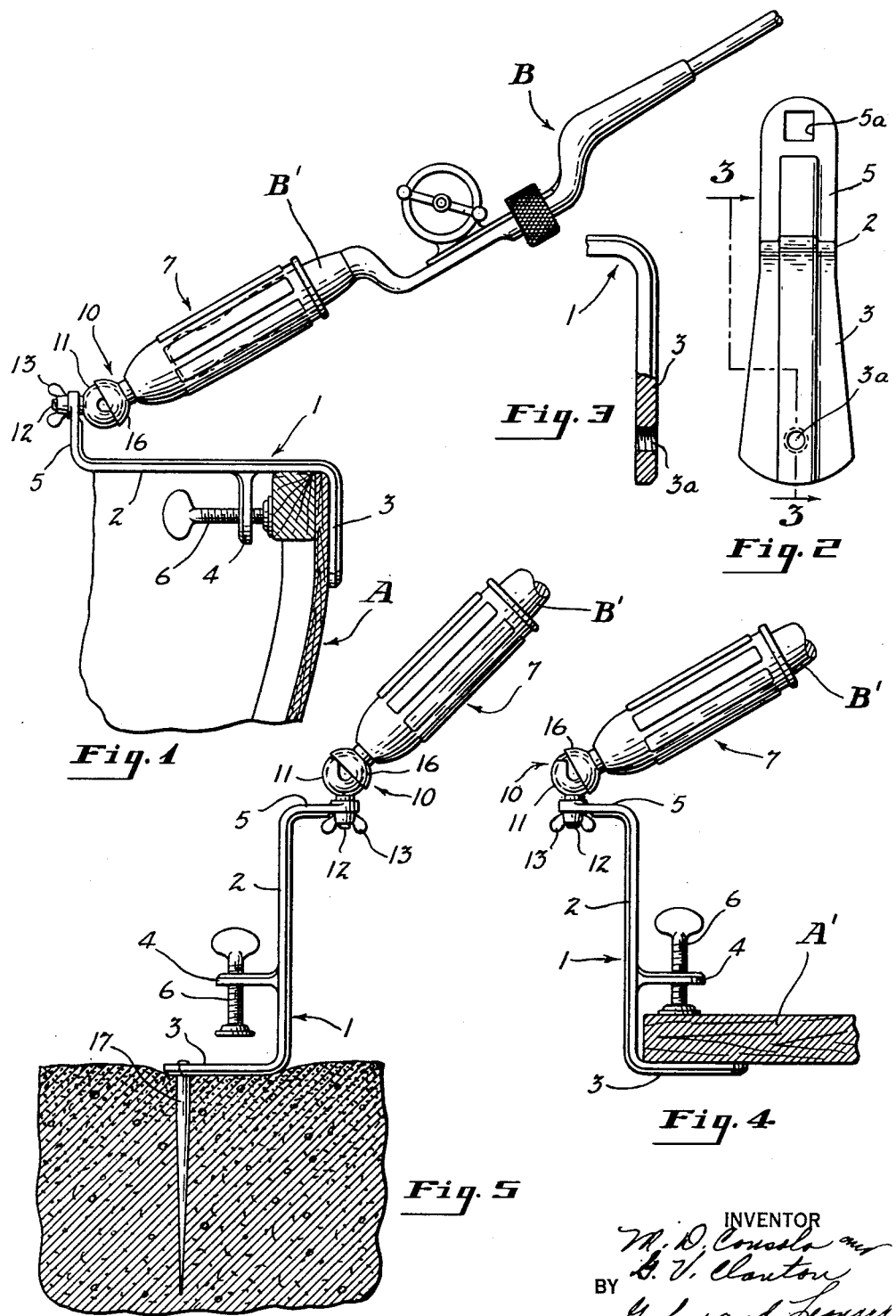
INVENTOR
M. D. Consolo
G. V. Clouton
BY
Gehr and Leonard
ATTORNEYS Nov. 16, 1954 M. D. CONSOLO ET AL 2,694,538
SUPPORTING MEANS FOR ROD-SHAPED BODIES
Filed June 18, 1948 2 Sheets-Sheet 2
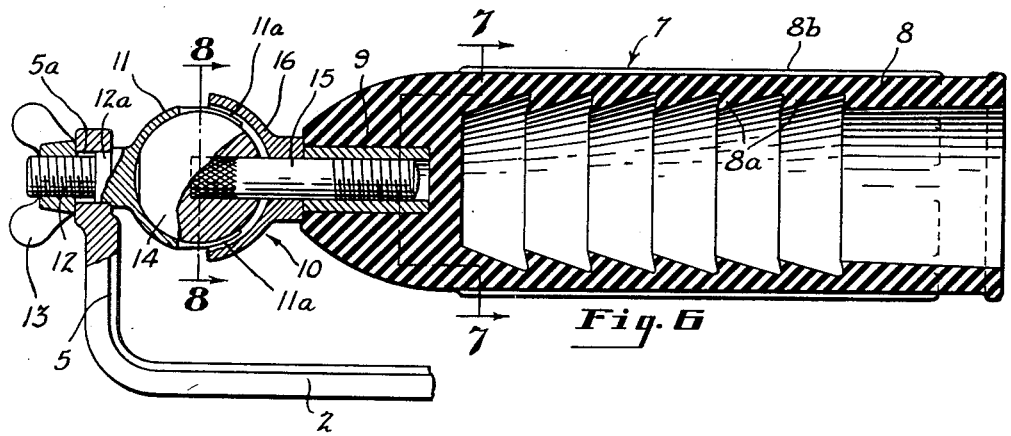
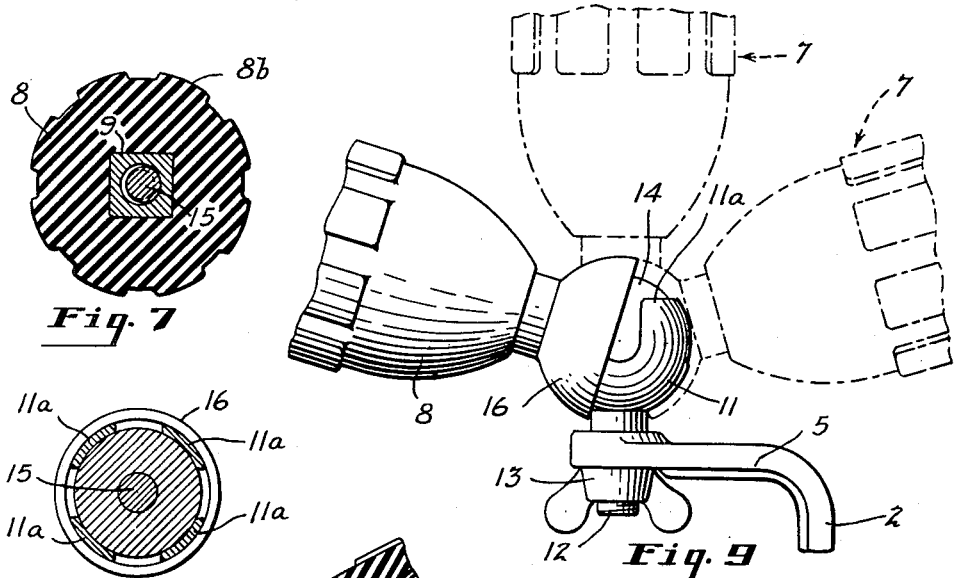
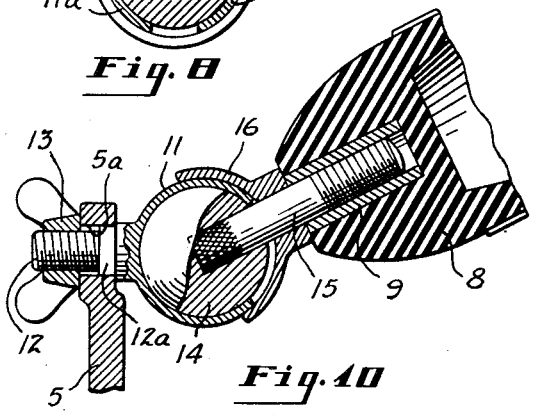
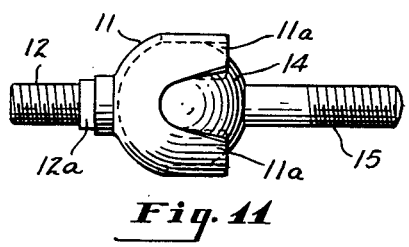
INVENTOR
M. D. Consolo
G. V. Clanton
BY
Gehr and Leonard
ATTORNEYS

United States Patent Office 2,694,538
Patented Nov. 16, 1954

2,694,538

SUPPORTING MEANS FOR ROD-SHAPED BODIES

Michael D. Consolo, Wilkinsburg, and George V. Clanton, Jamestown, Pa.; said Consolo assignor to said Clanton Application June 18, 1948, Serial No. 33,787

2 Claims. (Cl. 248—42)

The invention relates to adjustable supporting means for rod-shaped bodies such as fishing rods.

It is an object of the invention to provide such a supporting means which is characterized by adaptability for effective use under widely varying conditions, by marked convenience and ease of manipulation and by reliable performance of its functions.

A further object of the invention, more or less ancillary to that above stated, is to provide a support for fishing rods and like bodies which comprises a support element, a holder element and an adjustable connection between said elements and in which all three of these elements or parts are individually of novel and improved construction and are combined and cooperatively function in a novel and improved manner.

With such objects in view the invention consists in the forms, combinations and arrangements of parts hereinafter described and explained with reference to the accompanying drawings and defined in the appended claims, the drawings showing the invention applied as a fishing rod support.

In the drawings,

Fig. 1 is a side elevation of a fishing rod holder embodying the invention and showing the device mounted on the gunwale of a boat.

Fig. 2 is a right end elevation of the support element of the device as mounted in Fig. 1.

Fig. 3 is a fragmentary side elevation, partly broken away and sectioned, of a portion of the element shown in Fig. 2.

Fig. 4 is a side elevation of the fishing rod supporting means shown with modified arrangement for mounting on the seat of a boat.

Fig. 5 is a side elevation of the supporting means showing the device arranged for mounting on the ground.

Fig. 6 is an enlarged sectional view of the apparatus with a portion of the support element broken away.

Fig. 7 is a section on the broken line 7—7 of Fig. 6.

Fig. 8 is a section on the line 8—8 of Fig. 6.

Fig. 9 is an enlarged side elevation of a portion of the apparatus shown as mounted in Fig. 4.

Fig. 10 is an enlarged fragmentary sectional view of the joint or connection element of the apparatus.

Fig. 11 is a side elevation of the ball and main socket element of the adjustable connection with the socket element shown in an intermediate stage of fabrication.

Referring in detail to the construction shown, the numeral 1 designates generally an integrally formed support element comprising an elongated stem part 2, and clamp jaws 3 and 4 extending laterally from one end of the stem. Preferably, though not necessarily, the support 1 is also formed with an arm 5 extending laterally in the opposite direction from the other end of the stem 2. A clamping screw 6 is mounted in a threaded aperture of the jaw 4 so that the support 1 can be disengageably clamped on a structure such as the gunwale of a boat A, as shown in Fig. 1, or on a boat seat A' as shown in Fig. 4.

A holder for a fishing rod B, or other rod-shaped body, is designated generally by the numeral 7. This holder comprises an elongated body preferably made, by molding, of semi-hard rubber and deeply recessed longitudinally to receive the end of a rod-shaped body to be supported, such as the butt end B' of a fishing rod, as shown in Fig. 1. The holder body 8 has the walls of its recess formed with circumferential ribs 8a adapted to yield more or less when a fishing rod is inserted and provide a yieldable frictional grip on the rod. Externally the holder body 8 is formed with longitudinal ribs 8b to provide a good hand-gripping surface. An elongated metal insert 9 which is square in cross-section and formed with a threaded bore is molded in the closed end of the body 8 as shown in Figs. 6 and 7.

The numeral 10 designates generally a joint of the ball and socket type for adjustably connecting the holder 7 to the end of the support 1 remote from the clamp jaws thereof. This joint comprises a main socket element 11 which has a stem 12 formed with screw threads and with a short section 12a square in cross-section to fit in a square aperture 5a of the support arm 5. A wing nut 13 serves to secure the socket 11 to arm 5. The edge portion of the wall of the socket element 11 is notched at points 90° apart to form four correspondingly spaced fingers 11a as shown in Figs. 1 and 8.

Within the socket element 11 is disposed a ball element 14 which is fitted with a radially extending stem 15 threaded to cooperate with the threaded bore of the insert 9 of the holder 7. The stem 15 may be integrally connected with ball 14 by casting the latter around the stem. A second socket element 16 which is apertured to pass over stem 15 is interposed between the holder 8 and the main socket element 11 with the inner surface of element 16 engaging and cooperating with the cylindrical outer surface of socket 11.

The socket elements 11 and 16 as well as the support 1 may satisfactorily be cast of metal such as one of the zinc base alloys suitable for such service. The ball element 14 may also be formed of the same metal. The stem 15 is preferably formed of cold rolled steel and the insert 9 of brass. Of course the parts can be made of suitable materials other than those here mentioned.

In the fabrication and assembly of the ball and socket elements 14 and 11, the socket element 11 is preferably cast in the form shown in full lines in Fig. 11 so that the ball element 14 previously cast on the stem 15 can be inserted in the socket. The two elements assembled as shown in Fig. 11 may then be placed in a die and the finger portions 11a of the socket bent and formed around the ball element as shown in other views of the drawings. It will be noted that the socket element 11 as cast has its finger parts 11a tapering toward their ends so that when the fingers are bent inward to conform to the outer surface of the ball 14 the notches or openings between the fingers are left approximately uniform in width so that the stem 15 of the ball element can enter the notches when the joint is flexed and a wider adjustment of the joint is made possible.

In the use of the holder the ball and socket joint 10 can be assembled on the support 1 in either of two ways. If the device is to be used in fishing from a boat and it is desired to mount the device on the boat gunwale the socket element 11 of the joint is mounted on the side of the support arm 5 toward the support clamp. Then the support is clamped to the gunwale with the stem 2 of the support extending inboard as shown in Fig. 1. This mounting disposes the holder 7 in an in-board position where it can easily be reached by a fisherman seated in the boat. To adjust the holder 7 the fisherman need only grasp the body 8 with one hand, rotate the body slightly to loosen the ball and socket joint, permitting the holder 7 to be adjusted around the center of the joint to any one of an unlimited number of angular positions, whereupon by a slight reverse rotation of the body 8 the latter is locked in the desired adjusted position. The entire operation can be effected by the fisherman without change of his grip on the holder 7.

From an inspection of the drawings it will be seen that the construction of the ball-and-socket joint is such as to permit a limited swinging movement or adjustment of the holder 7 up to a total range of about 90° in any direction; while an angular adjustment of the holder up to a total range of nearly 180° is permitted in either of two planes at right angles to each other which correspond to the positions of the diametrically opposite notches between the fingers 11a of socket element 11, since in these positions the stem 15 of ball 14 can enter the notches and have greater angular movement.

When the device is to be mounted on a boat seat or other horizontal support such as the floor of a pier, or is to be mounted on the ground, the ball and socket joint is preferably mounted on the side of the support arm 5 away from the support clamp. This mounting of the ball and socket joint is illustrated in Fig. 4 where the device is attached to a boat seat and in Fig. 5 where it is mounted on the ground.

The mounting of the device on the ground as shown in Fig. 5 is facilitated by the construction of the support 1. It will be observed that the jaw 3 of the support is made longer than the jaw 4 so that when the spike 17 is attached to jaw 3 as shown in the drawing the fisherman can easily force the spike into relatively hard ground by placing his foot on the jaw 3.

It will be apparent that although the device comprises a small number of parts, the support 1 in particular being formed in one piece, the device is capable of meeting a very wide range of operating conditions because it is adapted to be mounted in a variety of ways and the rod holder is capable of a wide range of adjustments.

The ease and convenience with which the holder can be manipulated to effect adjustment by merely grasping the holder body with one hand is apparent.

It is to be understood that the invention is not limited to the particular constructions which have been illustrated and described but that it can be embodied in any equivalent forms within the scope of the appended claims.

What is claimed is:

1. In holding means for fishing rods, the combination of a rigid support comprising an elongated stem, a pair of clamp jaws extending laterally from one side of the stem adjacent one end thereof and an arm extending laterally from the opposite side of the stem adjacent the other end thereof, the arm having a through aperture with its axis extending in the same general direction as the stem of the support; a clamping screw mounted in one jaw of the support to cooperate with the other jaw; a rod holder constructed to receive and support the butt end of a fishing rod; and angularly adjustable joint means securing the rod holder to the arm of the support and comprising a joint element formed to extend into the aperture of the support arm alternatively from either side of the arm so as to project from the arm alternatively toward or away from the clamp end of the support stem, and screw thread means for rigidly securing the joint element in the two alternative positions in relation to the support arm.

2. A holding means for fishing rods as claimed in claim 1 in which one of the clamp jaws of the rigid support is formed with an aperture which has its axis substantially parallel to the stem of the support and is constructed to detachably engage the end of a supporting ground spike.

References Cited in the file of this patent

UNITED STATES PATENTS

| Number | Name | Date |
|---|---|---|
| 278,973 | Kizer | June 5, 1883 |
| 374,737 | Geils | Dec. 13, 1887 |
| 561,441 | Schmidt | June 2, 1896 |
| 650,337 | Nicholls | May 22, 1900 |
| 684,451 | Mowry | Oct. 15, 1901 |
| 840,241 | Nootbaar | Jan. 1, 1907 |
| 2,265,330 | Waddle et al. | Dec. 9, 1941 |
| 2,530,265 | Phalen | Nov. 14, 1950 |

FOREIGN PATENTS

| Number | Country | Date |
|---|---|---|
| 443,345 | Great Britain | Feb. 26, 1936 |